US012027175B2

(12) United States Patent
Grancharov et al.

(10) Patent No.: US 12,027,175 B2
(45) Date of Patent: *Jul. 2, 2024

(54) TRANSFORM ENCODING/DECODING OF HARMONIC AUDIO SIGNALS

(71) Applicant: Telefonaktiebolaget LM Ericsson (publ), Stockholm (SE)

(72) Inventors: Volodya Grancharov, Solna (SE); Tomas Jansson Toftgård, Uppsala (SE); Sebastian Näslund, Solna (SE); Harald Pobloth, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 79 days.

This patent is subject to a terminal disclaimer.

(21) Appl. No.: 17/579,968

(22) Filed: Jan. 20, 2022

(65) Prior Publication Data

US 2022/0139408 A1 May 5, 2022

Related U.S. Application Data

(63) Continuation of application No. 16/737,451, filed on Jan. 8, 2020, now Pat. No. 11,264,041, which is a (Continued)

(51) Int. Cl.
*G10L 19/028* (2013.01)
*G10L 19/002* (2013.01)
(Continued)

(52) U.S. Cl.
CPC ........ *G10L 19/0212* (2013.01); *G10L 19/002* (2013.01); *G10L 19/028* (2013.01); *G10L 19/038* (2013.01)

(58) Field of Classification Search
CPC . G10L 19/002; G10L 19/038; G10L 19/0212; G10L 19/028; G10L 19/008;
(Continued)

(56) References Cited

U.S. PATENT DOCUMENTS 6,263,312 B1 * 7/2001 Kolesnik ............. G10L 19/0208 704/229
7,831,434 B2 11/2010 Mehrotra et al.
(Continued)

FOREIGN PATENT DOCUMENTS

CN 102081927 A 6/2011
RU 2409874 C9 5/2011
(Continued)

OTHER PUBLICATIONS

Bartkowiak, Maciej, et al., "Harmonic Sinusoidal+Noise Modeling of Audio based on Multiple F0 Estimation", Audio Engineering Society, Convention Paper 7510, 125th Convention, San Francisco, CA, Oct. 2-5, 2008, 1-8.

*Primary Examiner* — Vijay B Chawan
(74) *Attorney, Agent, or Firm* — Murphy, Bilak & Homiller, PLLC

(57) ABSTRACT

An encoder for encoding frequency transform coefficients of a harmonic audio signal include the following elements: A peak locator configured to locate spectral peaks having magnitudes exceeding a predetermined frequency dependent threshold. A peak region encoder configured to encode peak regions including and surrounding the located peaks. A low-frequency set encoder configured to encode at least one low-frequency set of coefficients outside the peak regions and below a crossover frequency that depends on the number of bits used to encode the peak regions. A noise-floor gain encoder configured to encode a noise-floor gain of at least one high-frequency set of not yet encoded coefficients outside the peak regions.

15 Claims, 12 Drawing Sheets

Related U.S. Application Data continuation of application No. 15/228,395, filed on Aug. 4, 2016, now Pat. No. 10,566,003, which is a continuation of application No. 14/387,367, filed as application No. PCT/SE2012/051177 on Oct. 30, 2012, now Pat. No. 9,437,204.

(60) Provisional application No. 61/617,216, filed on Mar. 29, 2012.

(51) Int. Cl.
*G10L 19/02* (2013.01)
*G10L 19/038* (2013.01)

(58) Field of Classification Search
CPC ....... G10L 19/022; G10L 19/04; G10L 19/03; G10L 19/12; G10L 19/093; G10L 19/004; G10L 19/24; G10L 19/02
See application file for complete search history.

(56) References Cited

U.S. PATENT DOCUMENTS

| | | | | |
|---|---|---|---|---|
| 7,885,819 | B2 * | 2/2011 | Koishida | G10L 19/008 704/500 |
| 7,953,604 | B2 * | 5/2011 | Mehrotra | G10L 21/038 704/E21.011 |
| 7,953,605 | B2 | 5/2011 | Sinha et al. | |
| 8,046,214 | B2 * | 10/2011 | Mehrotra | G10L 19/008 455/72 |
| 8,392,179 | B2 * | 3/2013 | Yu | G10L 19/12 704/214 |
| 9,437,204 | B2 * | 9/2016 | Grancharov | G10L 19/002 |
| 9,626,978 | B2 | 4/2017 | Naslund et al. | |
| 10,002,617 | B2 * | 6/2018 | Näslund | G10L 19/02 |
| 10,566,003 | B2 * | 2/2020 | Grancharov | G10L 19/038 |
| 11,264,041 | B2 * | 3/2022 | Grancharov | G10L 19/038 |
| 2007/0238415 | A1 | 10/2007 | Sinha et al. | |
| 2008/0319739 | A1 * | 12/2008 | Mehrotra | G10L 19/008 704/E19.044 |
| 2011/0010168 | A1 * | 1/2011 | Yu | G10L 19/12 704/219 |
| 2011/0035226 | A1 * | 2/2011 | Mehrotra | G10L 21/038 704/500 |
| 2011/0178795 | A1 * | 7/2011 | Bayer | G10L 19/028 704/E19.01 |
| 2011/0196684 | A1 * | 8/2011 | Koishida | G10L 19/038 704/500 |
| 2012/0029923 | A1 | 2/2012 | Rajendran et al. | |
| 2012/0046955 | A1 | 2/2012 | Rajendran et al. | |
| 2012/0259645 | A1 * | 10/2012 | Budnikov | G10L 19/035 704/500 |
| 2012/0323584 | A1 * | 12/2012 | Koishida | G10L 19/03 704/500 |
| 2015/0046171 | A1 * | 2/2015 | Grancharov | G10L 19/002 704/500 |
| 2015/0088527 | A1 | 3/2015 | Nslund et al. | |
| 2016/0336016 | A1 | 11/2016 | Näslund et al. | |
| 2016/0343381 | A1 * | 11/2016 | Grancharov | G10L 19/028 |
| 2017/0178638 | A1 | 6/2017 | Näslund et al. | |
| 2020/0143818 | A1 * | 5/2020 | Grancharov | G10L 19/002 |
| 2022/0139408 | A1 * | 5/2022 | Grancharov | G10L 19/0212 704/204 |

FOREIGN PATENT DOCUMENTS

| | | | |
|---|---|---|---|
| RU | 2010101881 | A | 7/2011 |
| RU | 2436174 | C2 | 12/2011 |
| RU | 2010132643 | A | 2/2012 |
| WO | 2005027096 | A1 | 3/2005 |
| WO | 2009121298 | A1 | 10/2009 |
| WO | 2011063694 | A1 | 6/2011 |
| WO | 2011114933 | A1 | 9/2011 |

* cited by examiner

TRANSFORM ENCODING/DECODING OF HARMONIC AUDIO SIGNALS

RELATED APPLICATIONS

This application is a continuation of U.S. application Ser. No. 16/737,451 filed on 8 Jan. 2020, which is a continuation of U.S. application Ser. No. 15/228,395 filed on 4 Aug. 2016, now issued as U.S. Pat. No. 10,566,003, which is a continuation of U.S. application Ser. No. 14/387,367 filed on 23 Sep. 2014, now issued as U.S. Pat. No. 9,437,204, which is a U.S. National Phase Application of PCT/SE2012/051177 filed on 30 Oct. 2012, which claims benefit of Provisional Application No. 61/617,216 filed on 29 Mar. 2012. The entire contents of each aforementioned application is incorporated herein by reference.

TECHNICAL FIELD

The proposed technology relates to transform encoding/decoding of audio signals, especially harmonic audio signals.

BACKGROUND

Transform encoding is the main technology used to compress and transmit audio signals. The concept of transform encoding is to first convert a signal to the frequency domain, and then to quantize and transmit the transform coefficients. The decoder uses the received transform coefficients to reconstruct the signal waveform by applying the inverse frequency transform, see FIG. 1. In FIG. 1 an audio signal X(n) is forwarded to a frequency transformer 10. The resulting frequency transform Y(k) is forwarded to a transform encoder 12, and the encoded transform is transmitted to the decoder, where it is decoded by a transform decoder 14. The decoded transform $\hat{Y}(k)$ is forwarded to an inverse frequency transformer 16 that transforms it into a decoded audio signal $\hat{X}(n)$. The motivation behind this scheme is that frequency domain coefficients can be more efficiently quantized for the following reasons:

1) Transform coefficients (Y(k) in FIG. 1) are more uncorrelated than input signal samples (X(n) in FIG. 1).
2) The frequency transform provides energy compaction (more coefficients Y(k) are close to zero and can be neglected), and
3) The subjective motivation behind the transform is that the human auditory system operates on a transformed domain, and it is easier to select perceptually important signal components on that domain.

In a typical transform codec the signal waveform is transformed on a block by block basis (with 50% overlap), using the Modified Discrete Cosine Transform (MDCT). In an MDCT type transform codec a block signal waveform X(n) is transformed into an MDCT vector Y(k). The length of the waveform blocks corresponds to 20-40 ms audio segments. If the length is denoted by 2 L , the MDCT transform can be defined as:

$$Y(k) = \sqrt{\frac{2}{L}\sum_{n=0}^{2L-1} \sin\left[\left(n+\frac{1}{2}\right)\frac{\pi}{L}\right] \cos\left[\left(n+\frac{1}{2}+\frac{L}{2}\right)\left(k+\frac{1}{2}\right)\frac{\pi}{L}\right] X(n)} \tag{1}$$

for k=0, . . . L−1. Then the MDCT vector Y(k) is split into multiple bands (sub vectors), and the energy (or gain) G(j) in each band is calculated as:

$$G(j) = \sqrt{\frac{1}{N_j}\sum_{k=m_j}^{m_j+N_j-1} Y^2(k)} \tag{2}$$

where $m_j$ is the first coefficient in band j and $N_j$ refers to the number of MDCT coefficients in the corresponding bands (a typical range contains 8-32 coefficients). As an example of a uniform band structure, let $N_j$=8 for all j, then G(0) would be the energy of the first 8 coefficients, G(1) would be the energy of the next 8 coefficients, etc.

These energy values or gains give an approximation of the spectrum envelope, which is quantized, and the quantization indices are transmitted to the decoder. Residual sub-vectors or shapes are obtained by scaling the MDCT sub-vectors with the corresponding envelope gains, e.g. the residual in each The conventional transform encoding concept does not work well with very harmonic audio signals, e.g. single instruments. An example of such a harmonic spectrum is illustrated in FIG. 2 (for comparison a typical audio spectrum without excessive harmonics is shown FIG. 3). The reason is that the normalization with the spectrum envelope does not result in a sufficiently "flat" residual vector, and the residual encoding scheme cannot produce an audio signal of acceptable quality. This mismatch between the signal and the encoding model can be resolved only at very high bitrates, but in most cases this solution is not suitable.

SUMMARY

An object of the proposed technology is a transform encoding/decoding scheme that is more suited for harmonic audio signals.

The proposed technology involves a method of encoding frequency transform coefficients of a harmonic audio signal. The method includes the steps of:

- locating spectral peaks having magnitudes exceeding a predetermined frequency dependent threshold;
- encoding peak regions including and surrounding the located peaks;
- encoding at least one low-frequency set of coefficients outside the peak regions and below a crossover frequency that depends on the number of bits used to encode the peak regions;
- encoding a noise-floor gain of at least one high-frequency set of not yet encoded coefficients outside the peak regions.

The proposed technology also involves an encoder for encoding frequency transform coefficients of a harmonic audio signal. The encoder includes:

- a peak locator configured to locate spectral peaks having magnitudes exceeding a predetermined frequency dependent threshold;
- a peak region encoder configured to encode peak regions including and surrounding the located peaks;
- a low-frequency set encoder configured to encode at least one low-frequency set of coefficients outside the peak regions and below a crossover frequency that depends on the number of bits used to encode the peak regions;

a noise-floor gain encoder configured to encode a noise-floor gain of at least one high-frequency set of not yet encoded coefficients outside the peak regions.

The proposed technology also involves a user equipment (UE) including such an encoder.

The proposed technology also involves a method of reconstructing frequency transform coefficients of an encoded frequency transformed harmonic audio signal. The method includes the steps of:

decoding spectral peak regions of the encoded frequency transformed harmonic audio signal;

decoding at least one low-frequency set of coefficients;

distributing coefficients of each low-frequency set outside the peak regions;

decoding a noise-floor gain of at least one high-frequency set of coefficients outside of the peak regions;

filling each high-frequency set with noise having the corresponding noise-floor gain.

The proposed technology also involves a decoder for reconstructing frequency transform coefficients of an encoded frequency transformed harmonic audio signal. The decoder includes:

- a peak region decoder configured to decode spectral peak regions of the encoded frequency transformed harmonic audio signal;
- a low-frequency set decoder configured to decode at least one low-frequency set of coefficients;
- a coefficient distributor configured to distribute coefficients of each low-frequency set outside the peak regions;
- a noise-floor gain decoder configured to decode a noise-floor gain of at least one high-frequency set of coefficients outside of the peak regions;
- a noise filler configured to fill each high-frequency set with noise having the corresponding noise-floor gain.

The proposed technology also involves a user equipment (UE) including such a decoder.

The proposed harmonic audio coding encoding/decoding scheme provides better perceptual quality than the conventional coding schemes for a large class of harmonic audio signals.

BRIEF DESCRIPTION OF THE DRAWINGS

The present technology, together with further objects and advantages thereof, may best be understood by making reference to the following description taken together with the accompanying drawings, in which.

DETAILED DESCRIPTION

Figure 2:
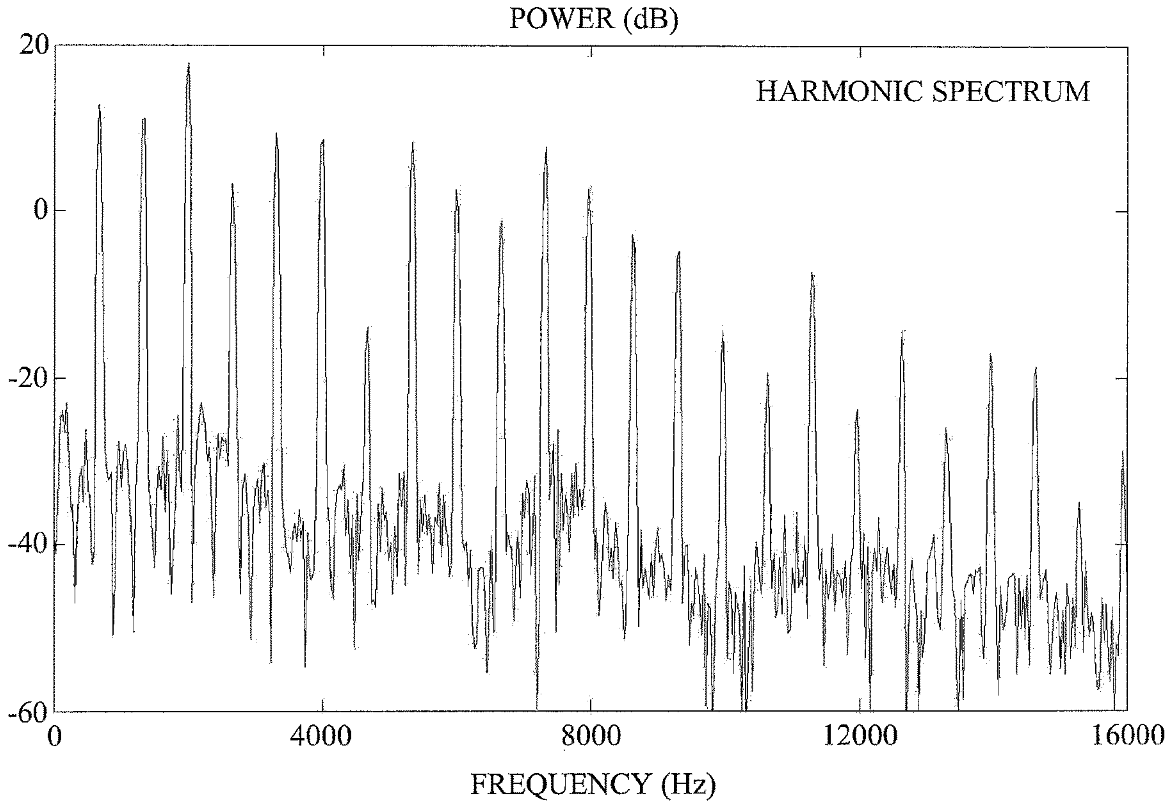
FIG. 2 illustrates a typical spectrum of a harmonic audio signal.
Figure 3:
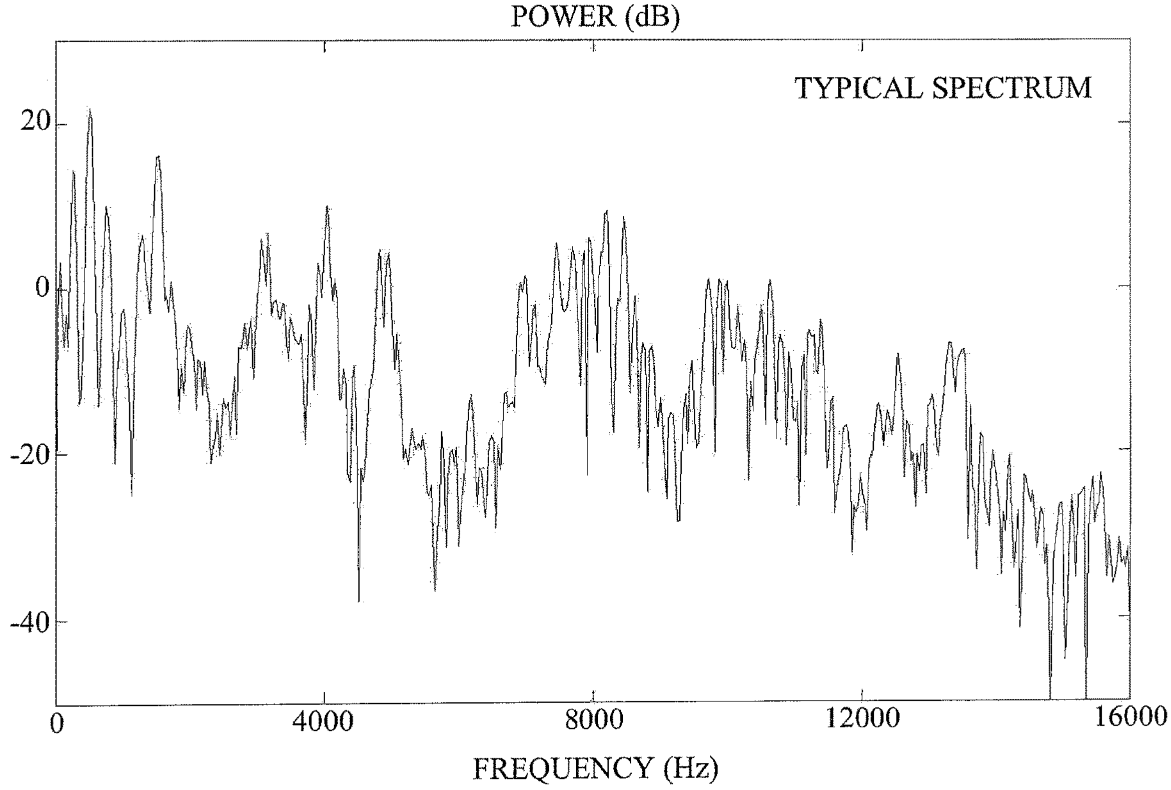
FIG. 3 illustrates a typical spectrum of a non-harmonic audio signal.

FIG. 2 illustrates a typical spectrum of a harmonic audio signal, and FIG. 3 illustrates a typical spectrum of a non-harmonic audio signal. The spectrum of the harmonic signal is formed by strong spectral peaks separated by much weaker frequency bands, while the spectrum of the non-harmonic audio signal is much smoother.

The proposed technology provides an alternative audio encoding model that handles harmonic audio signals better. The main concept is that the frequency transform vector, for example an MDCT vector, is not split into envelope and residual part, but instead spectral peaks are directly extracted and quantized, together with neighboring MDCT bins. At high frequencies, low energy coefficients outside the peaks neighborhoods are not coded, but noise-filled at the decoder. Here the signal model used in the conventional encoding, { spectrum envelope+residual} is replaced with a new model { spectral peaks+noise-floor}. At low frequencies, coefficients outside the peak neighborhoods are still coded, since they have an important perceptual role.

Encoder

Major steps on the encoder side are:

- Locate and code spectral peak regions;
- Code low-frequency (LF) spectral coefficients—the size of coded region depends on the number of bits remaining after peak region coding; and
- Code noise-floor gains for spectral coefficients outside the peak regions.

Figure 4:
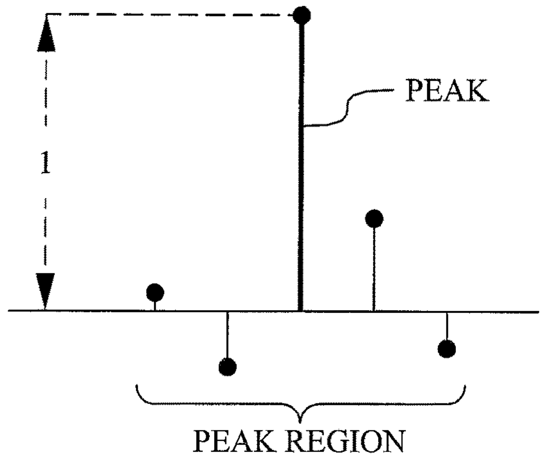
FIG. 4 illustrates a peak region.

First the noise-floor is estimated, then the spectral peaks are extracted by a peak picking algorithm (the corresponding algorithms are described in more detail in APPENDIX I-II). Each peak and its surrounding 4 neighbors are normalized to unit energy at the peak position, see FIG. 4. In other words, the entire region is scaled such that the peak has amplitude one. The peak position, gain (represents peak amplitude, magnitude) and sign are quantized. A Vector Quantizer (VQ) is applied to the MDCT bins surrounding the peak and searches for the index $I_{shape}$ of the codebook vector that provides the best match. The peak position, gain and sign, as well as the surrounding shape vectors are quantized and the quantization indices $\{I_{position}\ I_{gain}\ I_{sign}\ I_{shape}\}$ are transmitted to the decoder. In addition to these indices the decoder is also informed of the total number of peaks.

In the above example each peak region includes 4 neighbors that symmetrically surround the peak. However it is also feasible to have both fewer and more neighbors surrounding the peak in either symmetrical or asymmetrical fashion.

After the peak regions have been quantized, all available remaining bits (except reserved bits for noise-floor coding, see below) are used to quantize the low frequency MDCT coefficients. This is done by grouping the remaining unquantized MDCT coefficients into, for example, 24-dimensional bands starting from the first bin. Thus, these bands will cover the lowest frequencies up to a certain crossover frequency. Coefficients that have already been quantized in the peak coding are not included, so the bands are not necessarily made up from 24 consecutive coefficients. For this reason the bands will also be referred to as "sets" below.

The total number of LF bands or sets depends on the number of available bits, but there are always enough bits reserved to create at least one set. When more bits are available the first set gets more bits assigned until a threshold for the maximum number of bits per set is reached. If there are more bits available another set is created and bits are assigned to this set until the threshold is reached. This procedure is repeated until all available bits have been spent. This means that the crossover frequency at which this process is stopped will be frame dependent, since the number of peaks will vary from frame to frame. The crossover frequency will be determined by the number of bits that are available for LF encoding once the peak regions have been encoded.

Quantization of the LF sets can be done with any suitable vector quantization scheme, but typically some type of gain-shape encoding is used. For example, factorial pulse coding may be used for the shape vector, and scalar quantizer may be used for the gain.

A certain number of bits are always reserved for encoding a noise-floor gain of at least one high-frequency band of coefficients outside the peak regions, and above the upper frequency of the LF bands. Preferably two gains are used for this purpose. These gains may be obtained from the noise-floor algorithm described in APPENDIX I. If factorial pulse coding is used for the encoding the low-frequency bands some LF coefficients may not be encoded. These coefficients can instead be included in the high-frequency band encoding. As in the case of the LF bands, the HF bands are not necessarily made up from consecutive coefficients. For this reason the bands will also be referred to as "sets" below.

If applicable, the spectrum envelope for a bandwidth extension (BWE) region is also encoded and transmitted. The number of bands (and the transition frequency where the BWE starts) is bitrate dependent, e.g. 5.6 kHz at 24 kbps and 6.4 kHz at 32 kbps.

Figure 5:
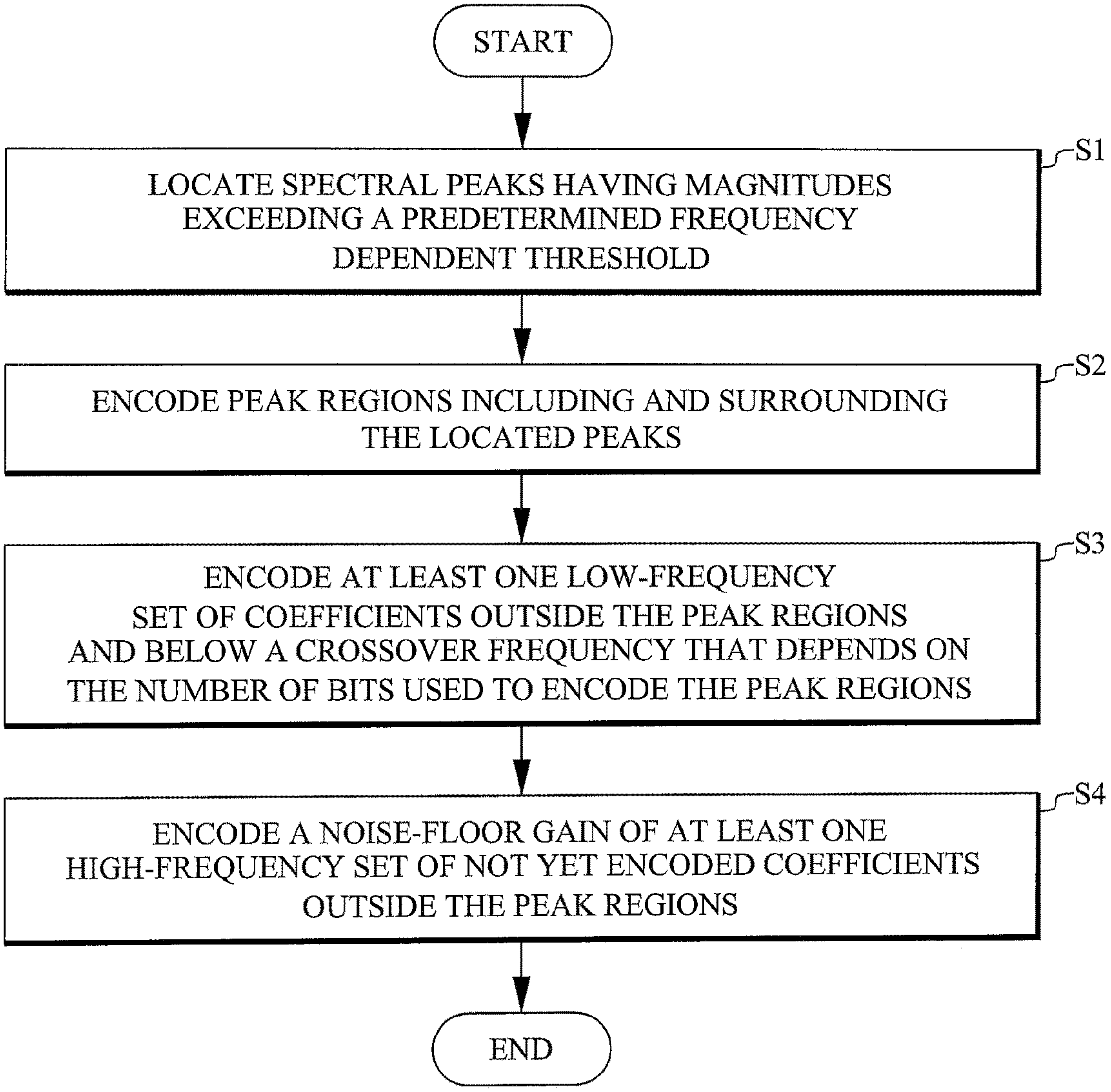
FIG. 5 is a flow chart illustrating the proposed encoding method.

FIG. 5 is a flow chart illustrating the proposed encoding method from a general perspective. Step S1 locates spectral peaks having magnitudes exceeding a predetermined frequency dependent threshold. Step S2 encodes peak regions including and surrounding the located peaks. Step S3 encodes at least one low-frequency set of coefficients outside the peak regions and below a crossover frequency that depends on the number of bits used to encode the peak regions. Step S4 encodes a noise-floor gain of at least one high-frequency set of not yet encoded (still uncoded or remaining) coefficients outside the peak regions.

Figure 6A:
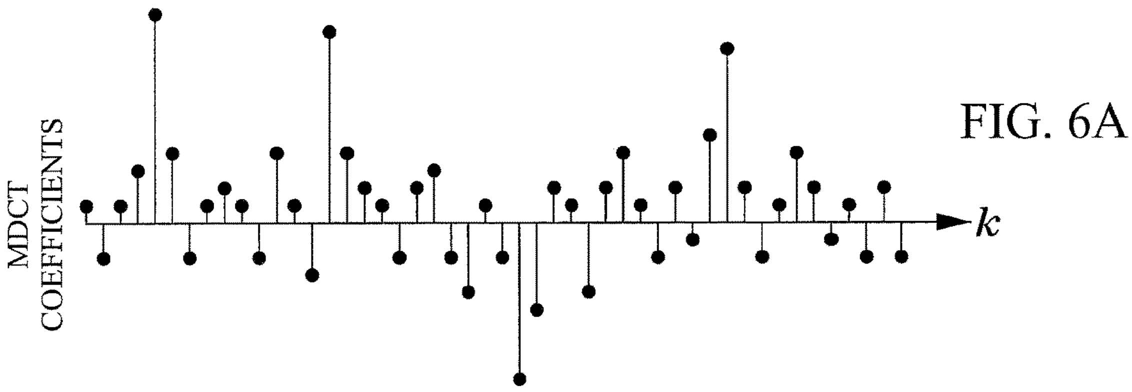
FIG. 6A-D illustrates an example embodiment of the proposed encoding method.
Figure 6B:
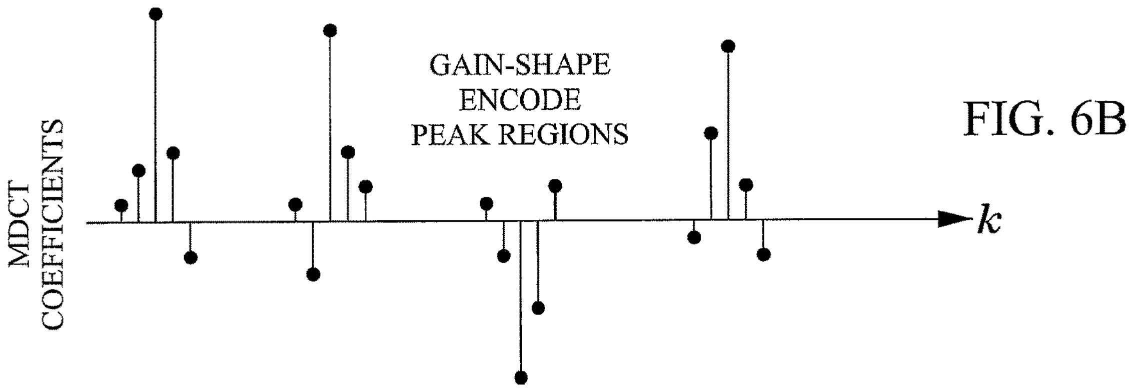
Figure 6C:
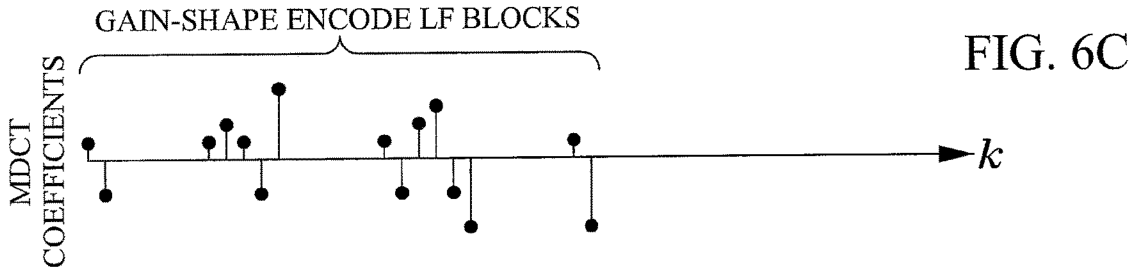

FIG. 6A-D illustrates an example embodiment of the proposed encoding method. FIG. 6A illustrates the MDCT transform of the signal frame to be encoded. In the figure there are fewer coefficients than in an actual signal. However, it should be kept in mind that purpose of the figure is only to illustrate the encoding process. FIG. 6B illustrates 4 identified peak regions ready for gain-shape encoding. The method described in APPENDIX II can be used to find them. Next the LF coefficients outside the peak regions are collected in FIG. 6C. These are concatenated into blocks that are gain-shape encoded. The remaining coefficients of the original signal in FIG. 6A are the high-frequency coefficients illustrated in FIG. 6D. They are divided into 2 sets and encoded (as concatenated blocks) by a noise-floor gain for each set. This noise-floor gain can be obtained from the energy of each set or by estimates obtained from the noise-floor estimation algorithm described in APPENDIX I.

Figure 1:
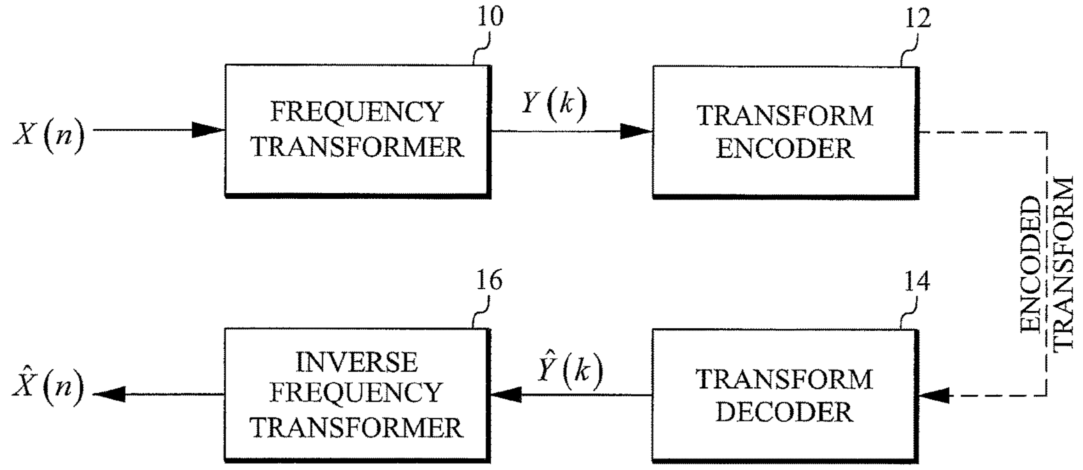
FIG. 1 illustrates the frequency transform coding concept.
Figure 7:
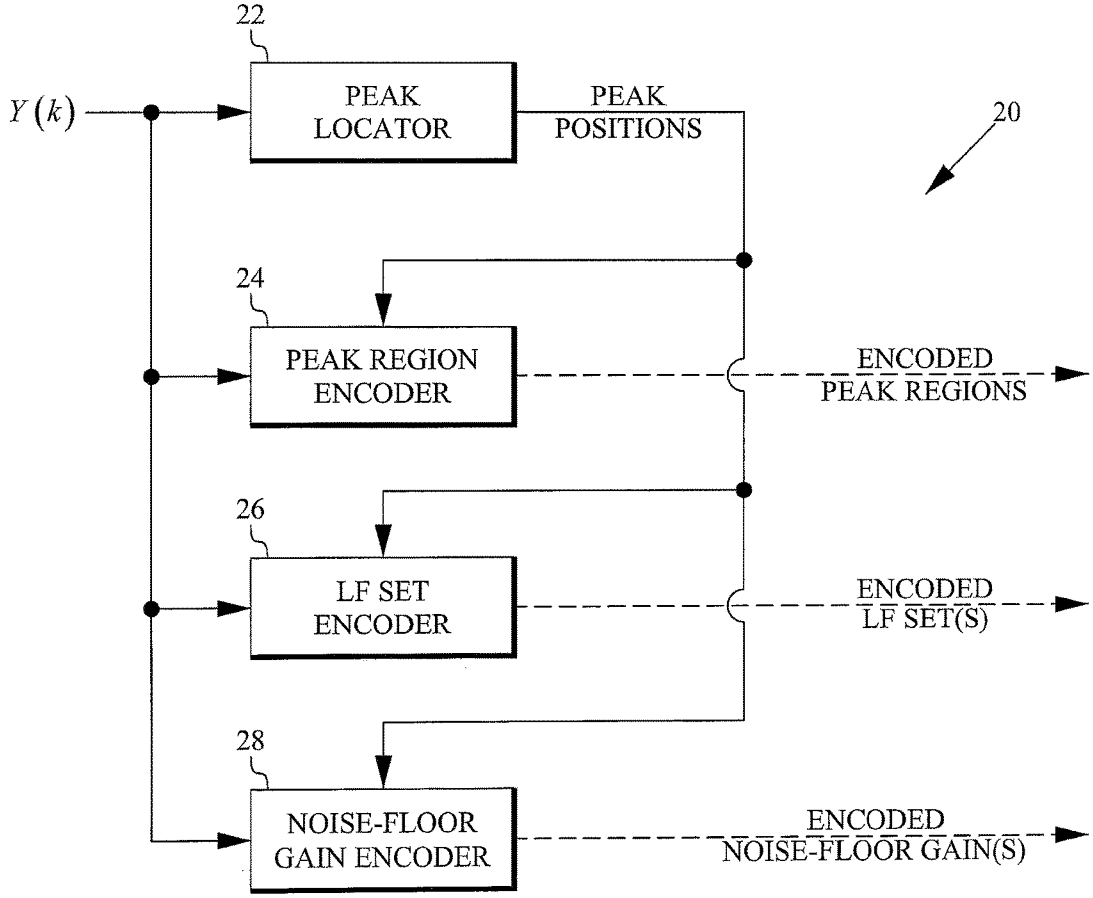
FIG. 7 is a block diagram of an example embodiment of the proposed encoder.

FIG. 7 is a block diagram of an example embodiment of a proposed encoder 20. A peak locator 22 is configured to locate spectral peaks having magnitudes exceeding a predetermined frequency dependent threshold. A peak region encoder 24 is configured to encode peak regions including and surrounding the extracted peaks. A low-frequency set encoder 26 is configured to encode at least one low-frequency set of coefficients outside the peak regions and below a crossover frequency that depends on the number of bits used to encode the peak regions. A noise-floor gain encoder 28 is configured to encode a noise-floor gain of at least one high-frequency set of not yet encoded coefficients outside the peak regions. In this embodiment the encoders 24, 26, 28 use the detected peak position to decide which coefficients to include in the respective encoding.

Decoder

Major steps on the decoder are:

Reconstruct spectral peak regions;

Reconstruct LF spectral coefficients; and

Noise-fill non-coded regions with noise, scaled with the received noise-floor gains.

The audio decoder extracts, from the bit-stream, the number of peak regions and the quantization indices $\{I_{position}\ I_{gain}\ I_{sign}\ I_{shape}\}$ in order to reconstruct the coded peak regions. These quantization indices contain information about the spectral peak position, gain and sign of the peak, as well as the index for the codebook vector that provides the best match for the peak neighborhood.

The MDCT low-frequency coefficients outside the peak regions are reconstructed from the encoded LF coefficients.

The MDCT high-frequency coefficients outside the peak regions are noise-filled at the decoder. The noise-floor level is received by the decoder, preferably in the form of two coded noise-floor gains (one for the lower and one for the upper half or part of the vector).

If applicable, the audio decoder performs a BWE from a pre-defined transition frequency with the received envelope gains for HF MDCT coefficients.

Figure 8:
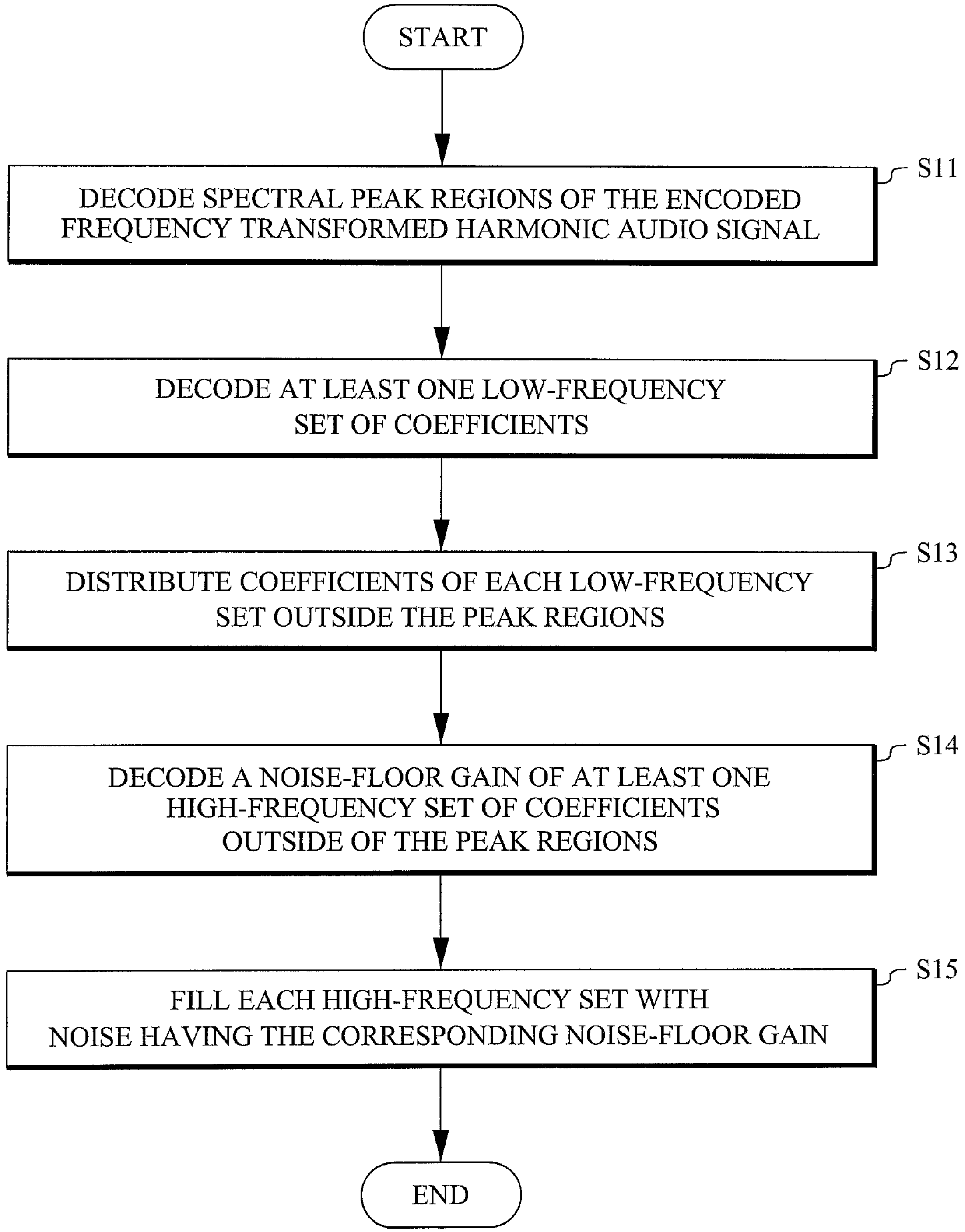
FIG. 8 is a flow chart illustrating the proposed decoding method.

FIG. 8 is a flow chart illustrating the proposed decoding method from a general perspective. Step S11 decodes spectral peak regions of the encoded frequency transformed harmonic audio signal. Step S12 decodes at least one low-frequency set of coefficients. Step S13 distributes coefficients of each low-frequency set outside the peak regions. Step S14 decodes a noise-floor gain of at least one high-frequency set of coefficients outside the peak regions. Step S15 fills each high-frequency set with noise having the corresponding noise-floor gain.

In an example embodiment the decoding of a low-frequency set is based on a gain-shape decoding scheme.

In an example embodiment the gain-shape decoding scheme is based on scalar gain decoding and factorial pulse shape decoding.

An example embodiment includes the step of decoding a noise-floor gain for each of two high-frequency sets.

Figure 6D:
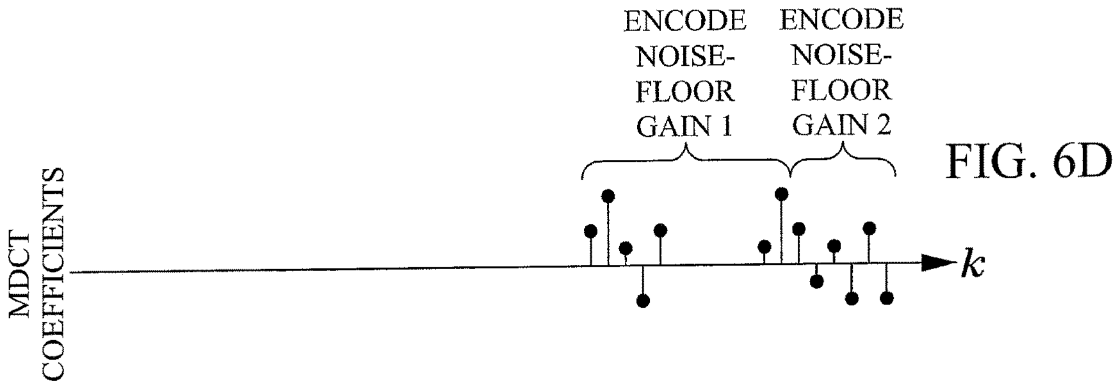
Figure 9A:
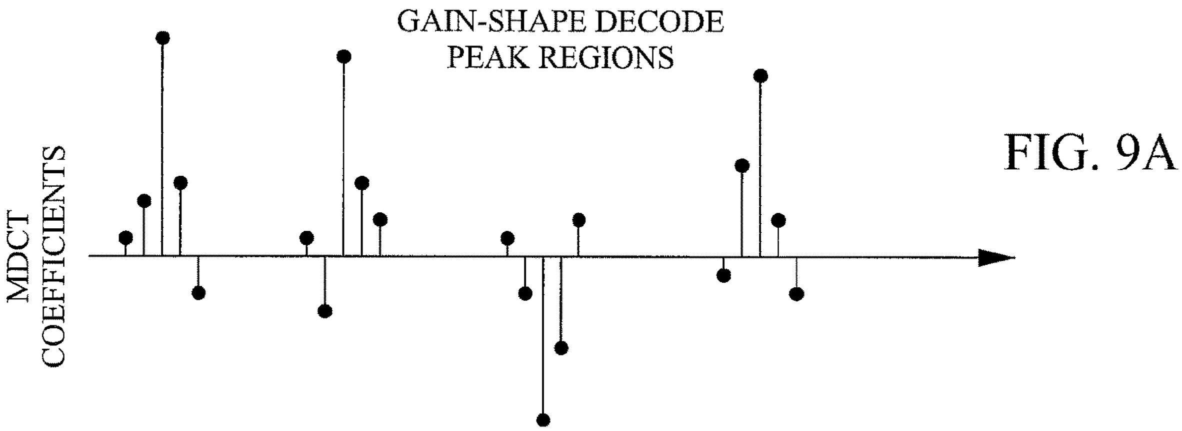
FIG. 9A-C illustrates an example embodiment of the proposed decoding method.
Figure 9B:
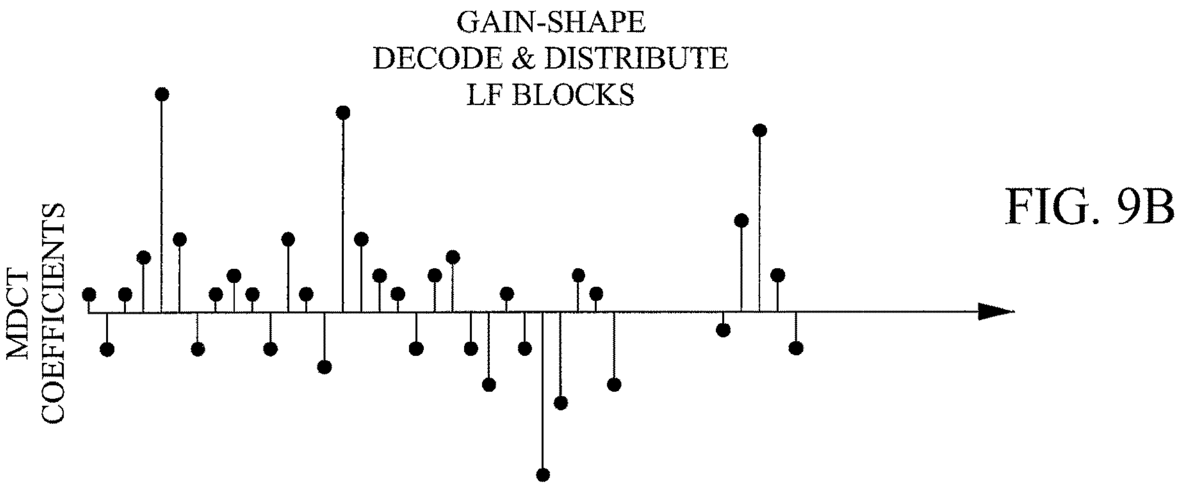
Figure 9C:
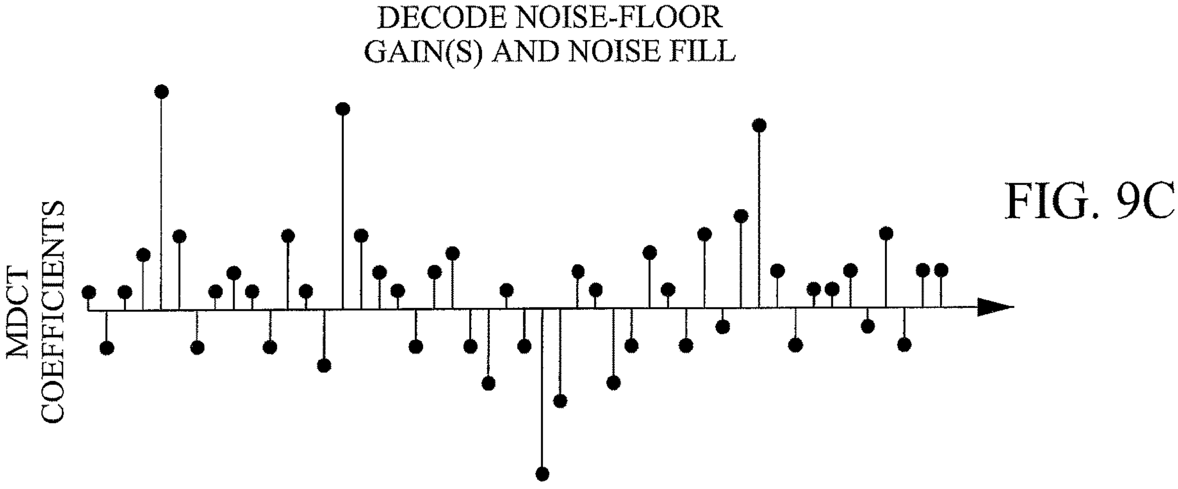

FIG. 9A-C illustrates an example embodiment of the proposed decoding method. The reconstruction of the frequency transform starts by gain-shape decoding the spectral peak regions and their positions, as illustrated in FIG. 9A. In FIG. 9B the LF set(s) are gain-shape decoded and the decoded transform coefficient are distributed in blocks outside the peak regions. In FIG. 9C the noise-floor gains are decoded and the remaining transform coefficients are filled with noise having corresponding noise-floor gains. In this way the transform of FIG. 6A has been approximately reconstructed. A comparison of FIG. 9C with FIG. 6A and 6D shows that the noise filled regions have different individual coefficients but the same energy, as expected.

Figure 10:
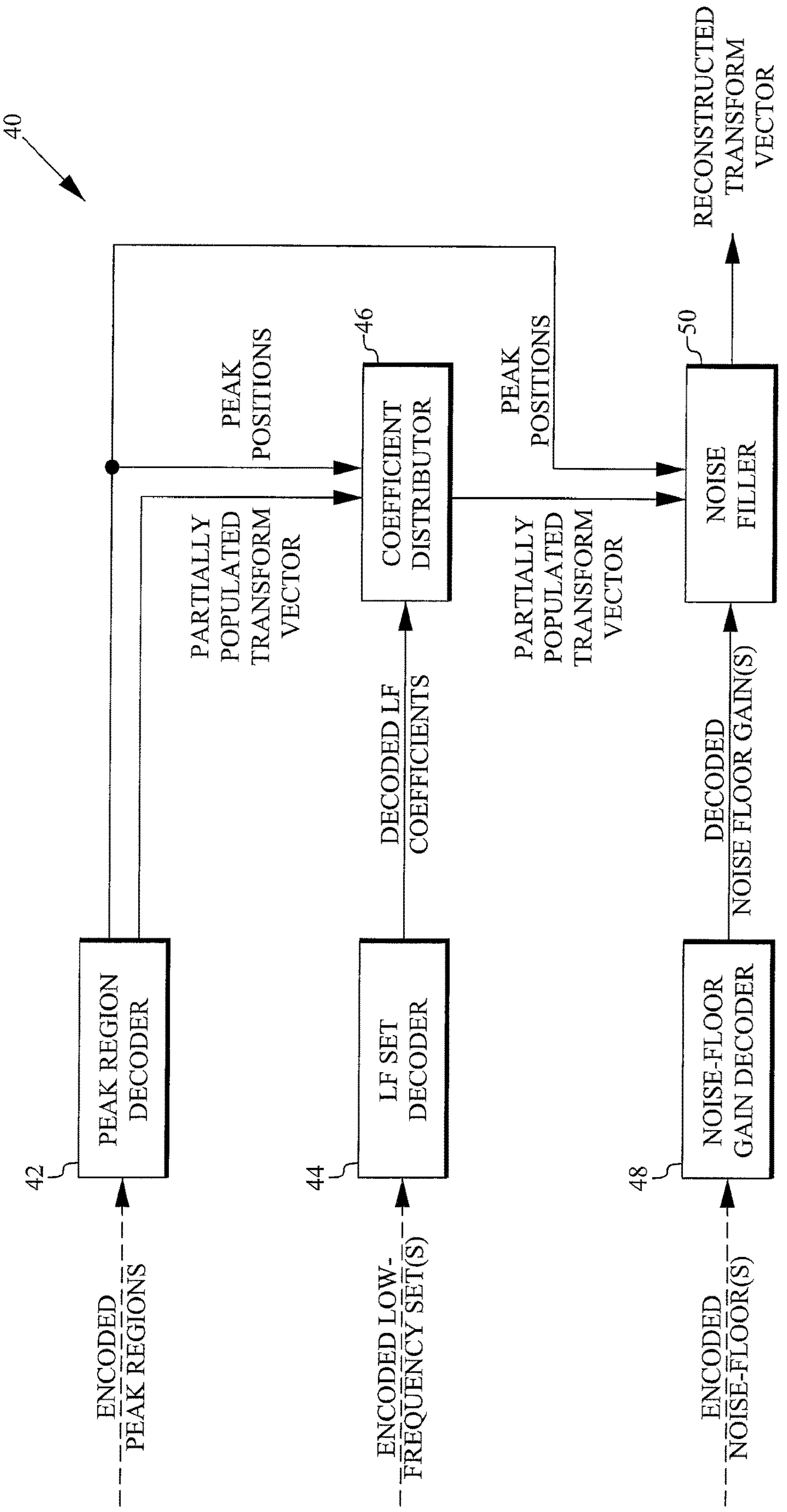
FIG. 10 is a block diagram of an example embodiment of the proposed decoder.

FIG. 10 is a block diagram of an example embodiment of a proposed decoder 40. A peak region decoder 42 is configured to decode spectral peak regions of the encoded frequency transformed harmonic audio signal. A low-frequency set decoder 44 is configured to decode at least one low-frequency set of coefficients. A coefficient distributor 46 configured to distribute coefficients of each low-frequency set outside the peak regions. A noise-floor gain decoder 48 is configured to decode a noise-floor of at least one high-frequency set of coefficients outside the peak regions. A noise filler 50 is configured to fill each high-frequency set with noise having the corresponding noise-floor gain. In this embodiment the peak positions are forwarded to the coefficient distributor 46 and the noise filler 50 to avoid over-writing of the peak regions.

The steps, functions, procedures and/or blocks described herein may be implemented in hardware using any conventional technology, such as discrete circuit or integrated circuit technology, including both general-purpose electronic circuitry and application-specific circuitry.

Alternatively, at least some of the steps, functions, procedures and/or blocks described herein may be implemented in software for execution by suitable processing equipment. This equipment may include, for example, one or several microprocessors, one or several Digital Signal Processors (DSP), one or several Application Specific Integrated Circuits (ASIC), video accelerated hardware or one or several suitable programmable logic devices, such as Field Programmable Gate Arrays (FPGA). Combinations of such processing elements are also feasible.

It should also be understood that it may be possible to reuse the general processing capabilities already present in the encoder/decoder. This may, for example, be done by reprogramming of the existing software or by adding new software components.

Figure 11:
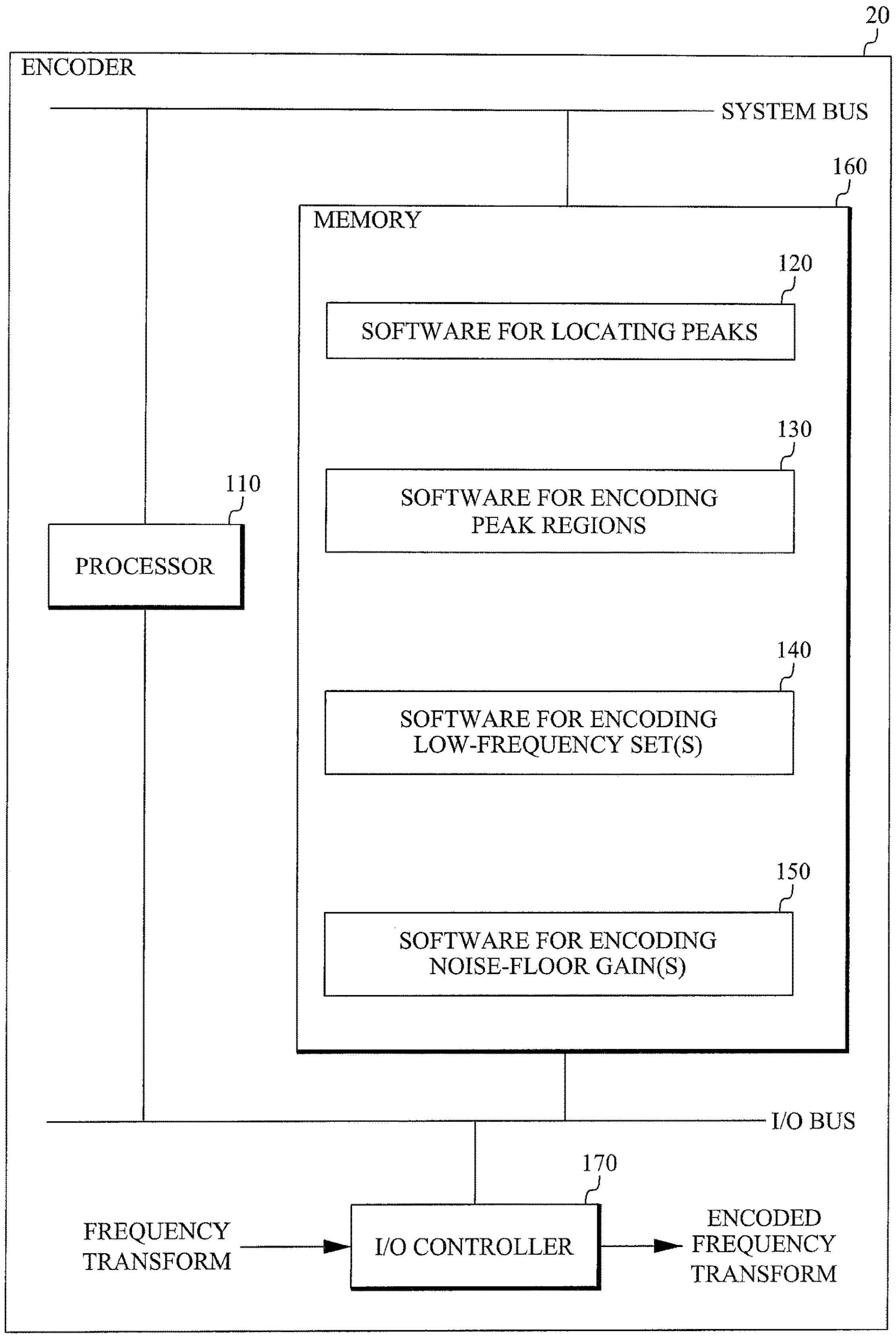
FIG. 11 is a block diagram of an example embodiment of the proposed encoder.

FIG. 11 is a block diagram of an example embodiment of the proposed encoder 20. This embodiment is based on a processor 110, for example a microprocessor, which executes software 120 for locating peaks, software 130 for encoding peak regions, software 140 for encoding at least one low-frequency set, and software 150 for encoding at least one noise-floor gain. The software is stored in memory 160. The processor 110 communicates with the memory over a system bus. The incoming frequency transform is received by an input/output (I/O) controller 170 controlling an I/O bus, to which the processor 110 and the memory 160 are connected. The encoded frequency transform obtained from the software 150 is outputted from the memory 160 by the I/O controller 170 over the I/O bus.

Figure 12:
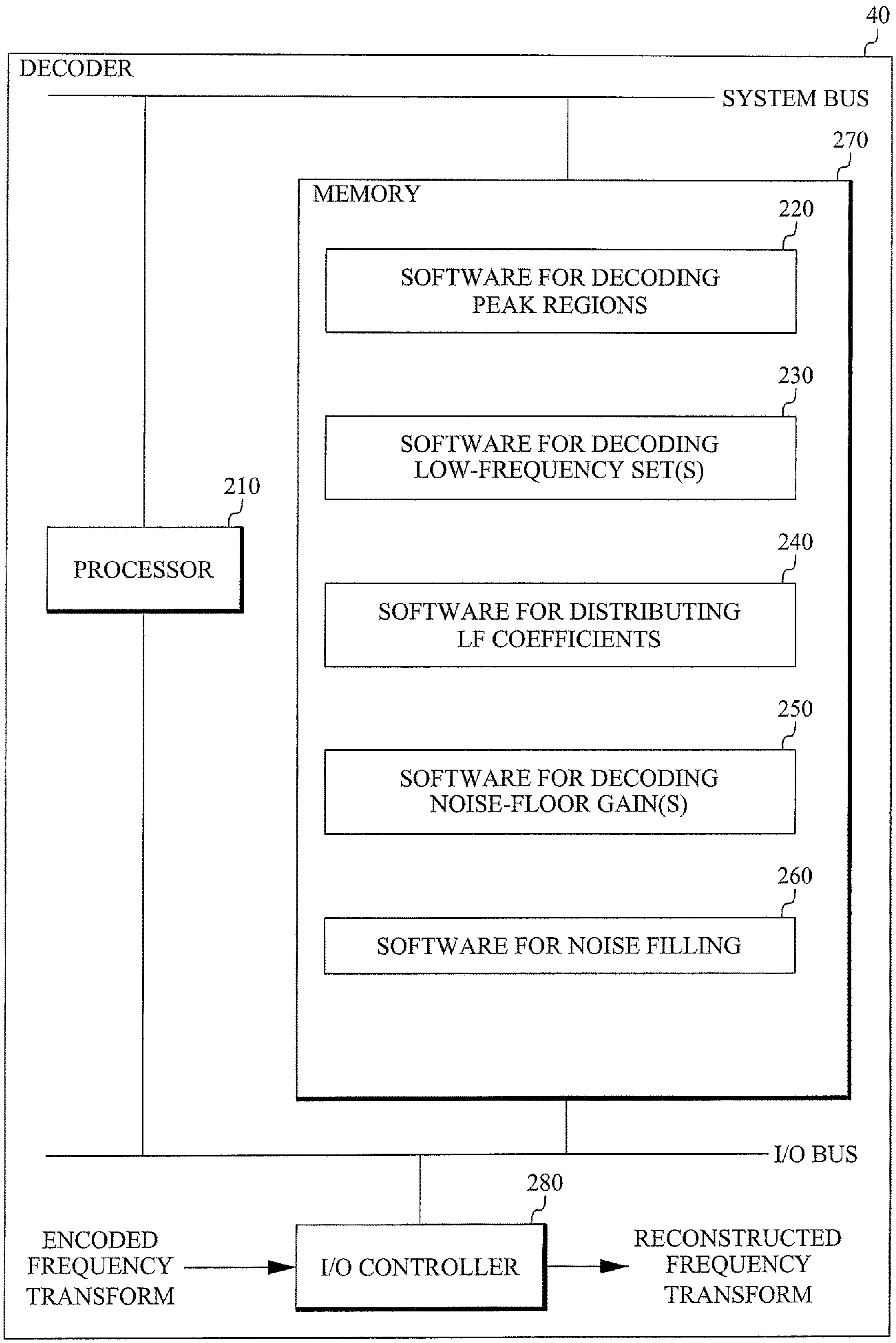
FIG. 12 is a block diagram of an example embodiment of the proposed decoder.

FIG. 12 is a block diagram of an example embodiment of the proposed decoder 40. This embodiment is based on a processor 210, for example a microprocessor, which executes software 220 for decoding peak regions, software 230 for decoding at least one low-frequency set, software 240 for distributing LF coefficients, software 250 for decoding at least one noise-floor gain, and software 260 for noise filling. The software is stored in memory 270. The processor 210 communicates with the memory over a system bus. The incoming encoded frequency transform is received by an input/output (I/O) controller 280 controlling an I/O bus, to which the processor 210 and the memory 280 are connected. The reconstructed frequency transform obtained from the software 260 is outputted from the memory 270 by the I/O controller 280 over the I/O bus.

The technology described above is intended to be used in an audio encoder/decoder, which can be used in a mobile device (e.g. mobile phone, laptop) or a stationary device, such as a personal computer. Here the term User Equipment (UE) will be used as a generic name for such devices.

Figure 13:
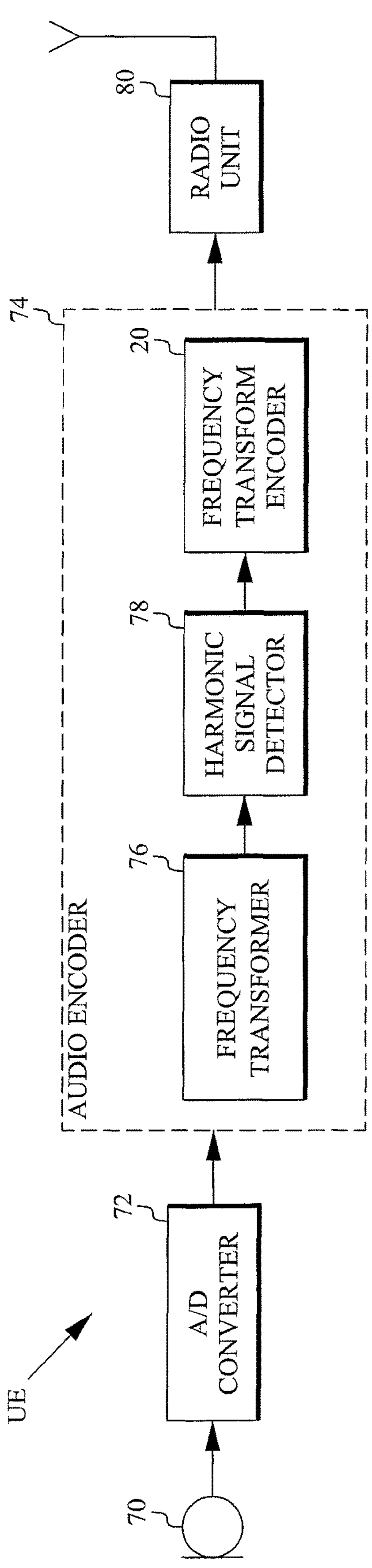
FIG. 13 is a block diagram of an example embodiment of a UE including the proposed encoder.

FIG. 13 is a block diagram of an example embodiment of a UE including the proposed encoder. An audio signal from a microphone 70 is forwarded to an A/D converter 72, the output of which is forwarded to an audio encoder 74. The audio encoder 74 includes a frequency transformer 76 transforming the digital audio samples into the frequency domain. A harmonic signal detector 78 determines whether the transform represents harmonic or non-harmonic audio. If it represents non-harmonic audio, it is encoded in a conventional encoding mode (not shown). If it represents harmonic audio, it is forwarded to a frequency transform encoder 20 in accordance with the proposed technology. The encoded signal is forwarded to a radio unit 80 for transmission to a receiver.

The decision of the harmonic signal detector 78 is based on the noise-floor energy $\overline{E}_{nf}$ and peak energy $\overline{E}_p$ in APPENDIX I and II. The logic is as follows:

IF $\overline{E}_p/\overline{E}_{nf}$ is above a threshold AND the number of detected peaks is in a predefined range THEN the signal is classified as harmonic. Otherwise the signal is classified as non-harmonic. The classification and thus the encoding mode is explicitly signaled to the decoder.

Figure 14:
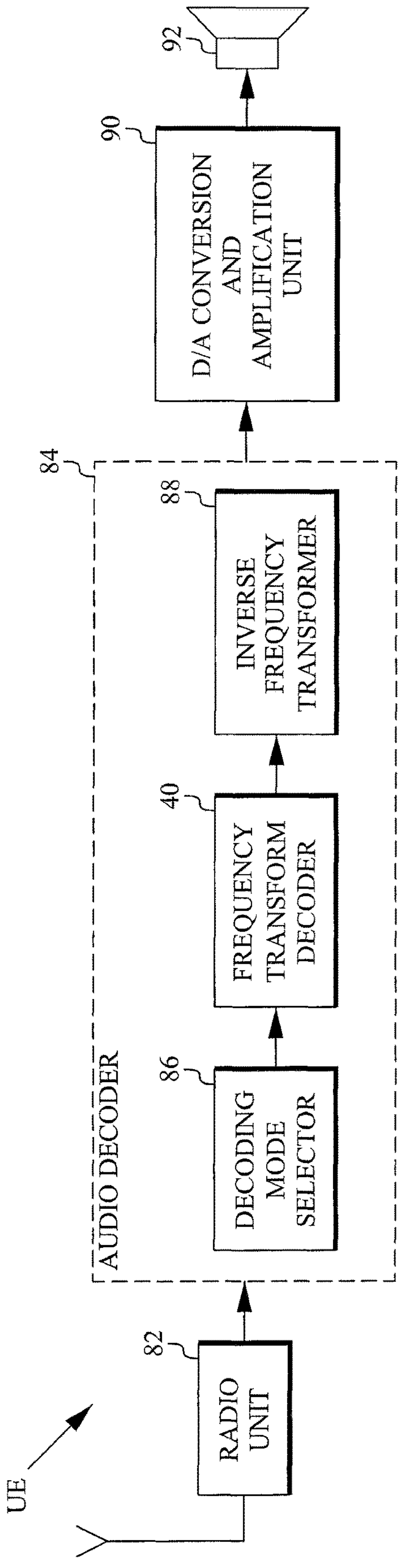
FIG. 14 is a block diagram of an example embodiment of a UE including the proposed decoder.

FIG. 14 is a block diagram of an example embodiment of a UE including the proposed decoder. A radio signal received by a radio unit 82 is converted to baseband, channel decoded and forwarded to an audio decoder 84. The audio decoder includes a decoding mode selector 86, which forwards the signal a frequency transform decoder 40 in accordance with the proposed technology if it has been classified as harmonic. If it has been classified as non-harmonic audio, it is decoded in a conventional decoder (not shown). The frequency transform decoder 40 reconstructs the frequency transform as described above. The reconstructed frequency transform is converted to the time domain in an inverse frequency transformer 88. The resulting audio samples are forwarded to a D/A conversion and amplification unit 90, which forwards the final audio signal to a loudspeaker 92.

Figure 15:
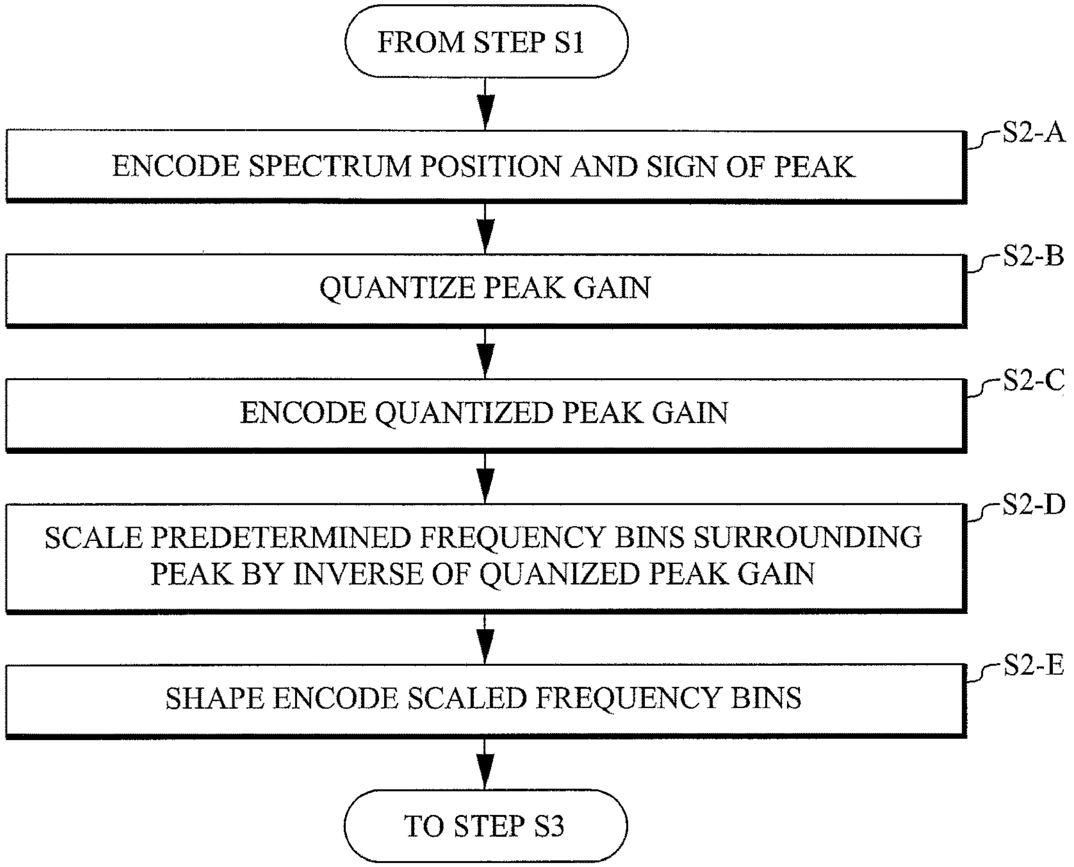
FIG. 15 is a flow chart of an example embodiment of a part of the proposed encoding method.

FIG. 15 is a flow chart of an example embodiment of a part of the proposed encoding method. In this embodiment the peak region encoding step S2 in FIG. 5 has been divided into sub-steps S2-A to S2-E. Step S2-A encodes spectrum position and sign of a peak. Step S2-B quantizes peak gain. Step S2-C encodes the quantized peak gain. Step S2-D scales predetermined frequency bins surrounding the peak by the inverse of the quantized peak gain. Step S2-E shape encodes the scaled frequency bins.

Figure 16:
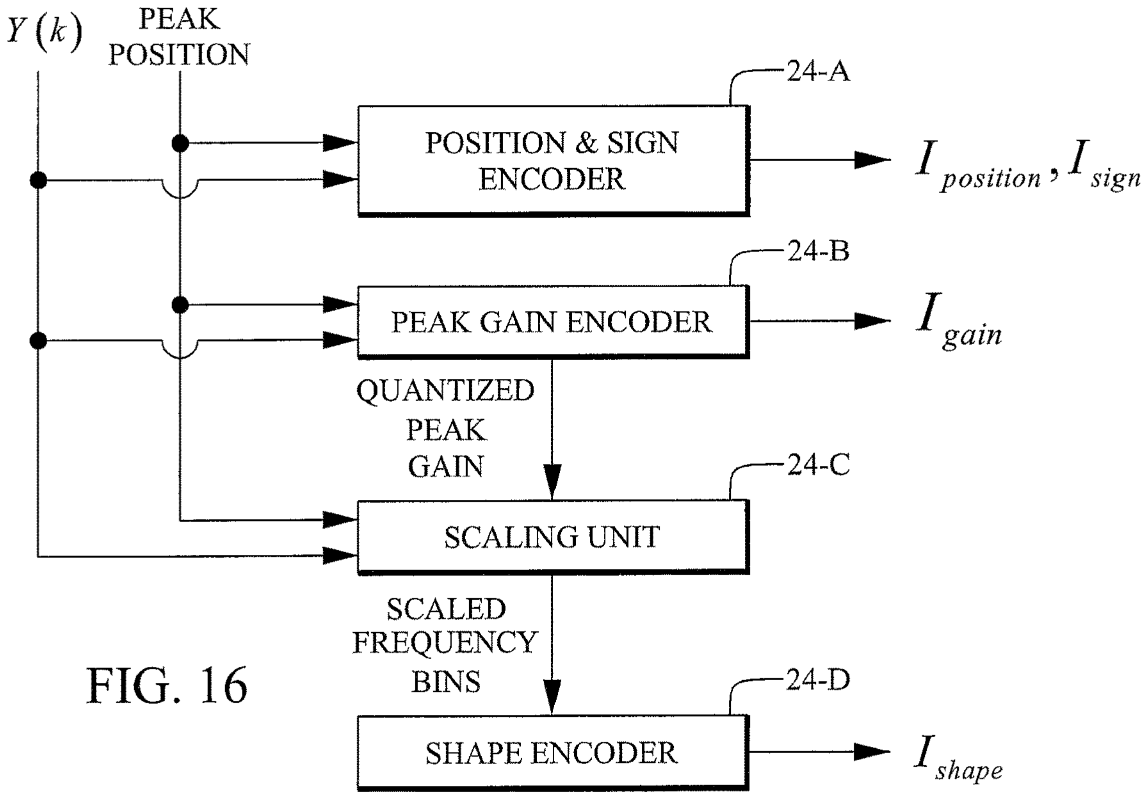
FIG. 16 is block diagram of an example embodiment of a peak region encoder in the proposed encoder.

FIG. 16 is block diagram of an example embodiment of a peak region encoder in the proposed encoder. In this embodiment the peak region encoder 24 includes elements 24-A to 24-D. Position and sign encoder 24-A is configured to encode spectrum position and sign of a peak. Peak gain encoder 24-B is configured to quantize peak gain and to encode the quantized peak gain. Scaling unit 24-C is configured to scale predetermined frequency bins surrounding the peak by the inverse of the quantized peak gain. Shape encoder 24-D is configured to shape encode the scaled frequency bins.

Figure 17:
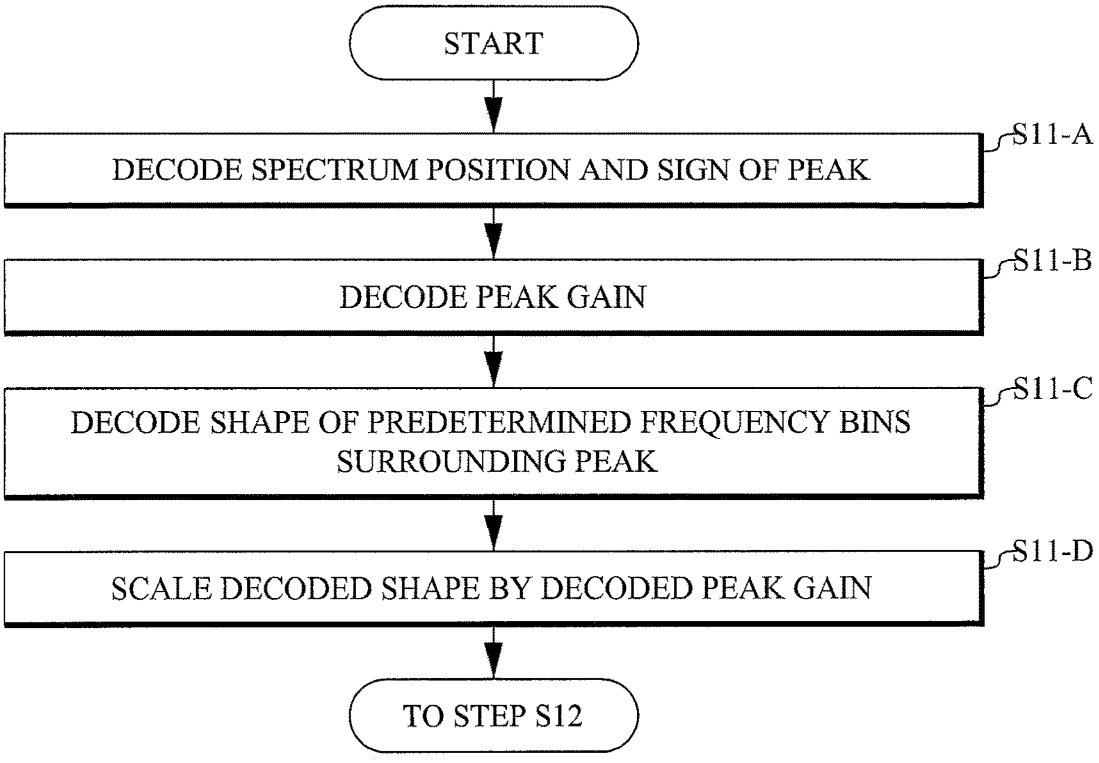
FIG. 17 is a flow chart of an example embodiment of a part of the proposed decoding method.

FIG. 17 is a flow chart of an example embodiment of a part of the proposed decoding method. In this embodiment the peak region decoding step S11 in FIG. 8 has been divided into sub-steps S11-A to S11-D. Step S11-A decodes spectrum position and sign of a peak. Step S11-B decodes peak gain. Step S11-C decodes a shape of predetermined frequency bins surrounding the peak. Step S11-D scales the decoded shape by the decoded peak gain.

Figure 18:
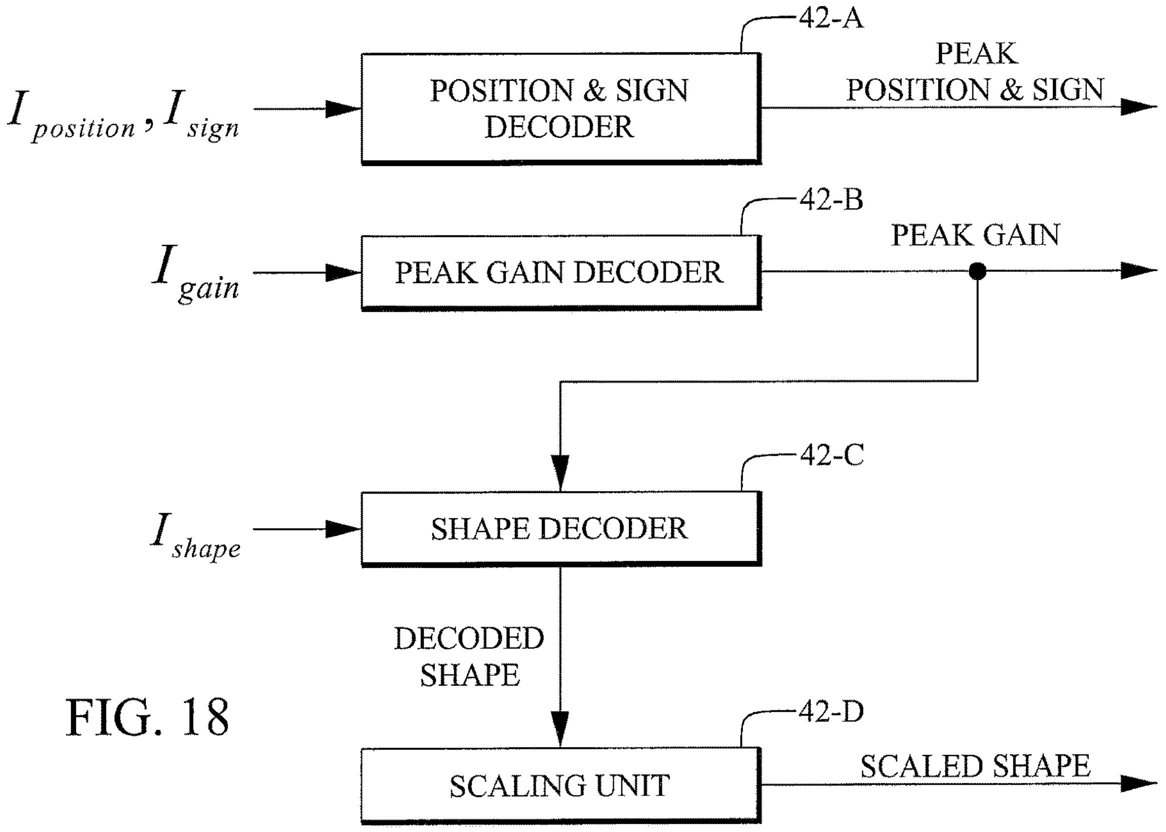
FIG. 18 is block diagram of an example embodiment of a peak region decoder in the proposed decoder.

FIG. 18 is block diagram of an example embodiment of a peak region decoder in the proposed decoder. In this embodiment the peak region decoder 42 includes elements 42-A to 42-D. A position and sign decoder 42-A is configured to decode spectrum position and sign of a peak. A peak gain decoder 42-B is configured to decode peak gain. A shape decoder 42-C is configured to decode a shape of predetermined frequency bins surrounding the peak. A scaling unit 42-D is configured to scale the decoded shape by the decoded peak gain.

Specific implementation details for a 24 kbps mode are given below.

- The codec operates on 20 ms frames, which at a bit rate of 24 kbps gives 480 bits per-frame.
- The processed audio signal is sampled at 32 kHz, and has an audio bandwidth of 16 kHz.
- The transition frequency is set to 5.6 kHz (all frequency components above 5.6 kHz are bandwidth-extended).
- Reserved bits for signaling and bandwidth extension of frequencies above the transition frequency: ~30-40.
- Bits for coding two noise-floor gains: 10.
- The number of coded spectral peak regions is 7-17. The number of bits used per peak region is ~20-22, which gives a total number of ~140-340 for coding all peaks positions, gains, signs, and shapes.
- Bits for coding low frequency bands: ~100-300.
- Coded low frequency bands: 1-4 (each band contains 8 MDCT bins). Since each MDCT bin corresponds to 25 Hz, coded low-frequency region corresponds to 200-800 Hz.
- The gains used for bandwidth extension and the peak gains are Huffman coded so the number of bits used by these might vary between frames even for a constant number of peaks.
- The peak position and sign coding makes use of an optimization which makes it more efficient as the number of peaks increase. For 7 peaks, position and sign requires about 6.9 bits per peak and for 17 peaks the number is about 5.7 bits per peak.

This variability in how many bits are used in different stages of the coding is no problem since the low frequency band coding comes last and just uses up whatever bits remain. However the system is designed so that enough bits always remain to encode one low frequency band.

The table below presents results from a listening test performed in accordance with the procedure described in ITU-R BS.1534-1 MUSHRA (Multiple Stimuli with Hidden Reference and Anchor). The scale in a MUSHRA test is 0 to 100, where low values correspond to low perceived quality, and high values correspond to high quality. Both codecs operated at 24 kbps. Test results are averaged over 24 music items and votes from 8 listeners.

| System Under Test | MUSHRA Score |
|---|---|
| Low-pass anchor signal (bandwidth 7 kHz) | 48.89 |
| Conventional coding scheme | 49.94 |
| Proposed harmonic coding scheme | 55.87 |
| Reference signal (bandwidth 16 kHz) | 100.00 |

It will be understood by those skilled in the art that various modifications and changes may be made to the proposed technology without departure from the scope thereof, which is defined by the appended claims.

APPENDIX I

The noise-floor estimation algorithm operates on the absolute values of transform coefficients $|Y(k)|$. Instantaneous noise-floor energies $E_{nf}(k)$ are estimated according to the recursion:

$$E_{nf}(k) = \alpha E_{nf}(k) + (1-\alpha)|Y(k)| \tag{3}$$

where $$\alpha = \begin{Bmatrix} 0.9578 \text{ if } |Y(k)| > E_{nf}(k-1) \\ 0.6472 \text{ if } |Y(k)| \le E_{nf}(k-1) \end{Bmatrix} \tag{4}$$

The particular form of the weighting factor a minimizes the effect of high-energy transform coefficients and emphasizes the contribution of low-energy coefficients. Finally, the noise-floor level $\overline{E}_{nf}$ is estimated by simply averaging the instantaneous energies $E_{nf}(k)$.

APPENDIX II

The peak-picking algorithm requires knowledge of noise-floor level and average level of spectral peaks. The peak energy estimation algorithm is similar to the noise-floor estimation algorithm, but instead of low-energy, it tracks high-spectral energies:

$$E_p(k) = \beta E_p(k) + (1-\beta)|Y(k)| \tag{5}$$

where $$\beta = \begin{matrix} 0.4223 \text{ if } |Y(k)| > E_p(k-1) \\ 0.8029 \text{ if } |Y(k)| \le E_p(k-1) \end{matrix} \tag{6}$$

In this case the weighting factor β minimizes the effect of low-energy transform coefficients and emphasizes the contribution of high-energy coefficients. The overall peak energy $\overline{E}_p$ is estimated by simply averaging the instantaneous energies.

When the peak and noise-floor levels are calculated, a threshold level θ is formed as:

$$\theta = \left(\frac{\overline{E}_p}{\overline{E}_{nf}}\right)^{\gamma} \overline{E}_{nf} \tag{7}$$

with γ=0.88579. Transform coefficients are compared to the threshold, and the ones with amplitude above it, form a vector of peak candidates. Since the natural sources do not typically produce peaks that are very close, e.g., 80 Hz, the vector with peak candidates is further refined. Vector elements are extracted in decreasing order, and the neighborhood of each element is set to zero. In this way only the largest element in certain spectral region remain, and the set of these elements form the spectral peaks for the current frame.

ABBREVIATIONS

ASIC Application Specific Integrated Circuit
BWE BandWidth Extension
DSP Digital Signal Processors
FPGA Field Programmable Gate Arrays
HF High-Frequency
LF Low-Frequency
MDCT Modified Discrete Cosine Transform
RMS Root Mean Square
VQ Vector Quantizer

What is claimed is:

1. A method of encoding Modified Discrete Cosine Transform (MDCT) coefficients Y (k) of a harmonic audio signal, said method comprising:
- performing peak encoding by encoding MDCT coefficients corresponding to at least some peak regions of the harmonic audio signal;
- performing low-frequency encoding by encoding MDCT coefficients that are outside of the peak regions and below a defined crossover frequency;
- performing noise-floor encoding by encoding a noise-floor gain of at least one high-frequency set of not yet encoded MDCT coefficients outside of the peak regions; and
- outputting, as an encoded frequency transform of the harmonic audio signal, the encoded MDCT coefficients and the encoded noise-floor gain.

2. The method of claim 1, wherein the low-frequency encoding uses reserved bits and any available bits not used for performing the peak encoding, and wherein the noise-floor encoding uses further reserved bits.

3. The method of claim 1, wherein, from among an overall number of bits, up to a first number of bits is used for the peak encoding, a first number of reserved bits and any ones of the first number of bits not consumed in the peak encoding are used for the low-frequency encoding, and a second number of reserved bits is used for the noise-floor encoding.

4. The encoding method of claim 1, wherein each MDCT coefficient represents a frequency bin, and wherein performing the peak encoding comprises, for each peak region that is encoded:
- encoding the spectrum position and sign of the MDCT coefficient representing the peak;
- quantizing the peak gain;
- encoding the quantized peak gain;
- scaling the MDCT coefficients in surrounding frequency bins by the inverse of the quantized peak gain; and
- shape encoding the scaled MDCT coefficients.

5. The encoding method of claim 1, wherein each peak region comprises the frequency bin at the spectrum position of the corresponding peak and at least one frequency bin on each side of the frequency bin at the spectrum position of the corresponding peak.

6. The encoding method of claim 1, wherein performing the low-frequency encoding comprises encoding in order from lowest frequency to highest frequency, according to a total number of bits available for the low-frequency encoding.

7. The encoding method of claim 1, wherein the low-frequency encoding is based on a gain-shape encoding scheme that is based on scalar gain quantization and factorial pulse shape encoding.

8. An encoder for encoding Modified Discrete Cosine Transform (MDCT) coefficients Y (k) of a harmonic audio signal, said encoder comprising:
- a processor configured to:
  - perform peak encoding, by encoding MDCT coefficients corresponding to at least some peak regions of the harmonic audio signal;
  - perform low-frequency encoding, by encoding MDCT coefficients that are outside of the peak regions and below a defined crossover frequency;
  - perform noise-floor encoding, by encoding a noise-floor gain of at least one high- frequency set of not yet encoded MDCT coefficients outside of the peak regions; and
  - output, as an encoded frequency transform of the harmonic audio signal, the encoded MDCT coefficients and the encoded noise-floor gain.

9. The encoder of claim 8, wherein the low-frequency encoding uses reserved bits and any available bits not used for performing the peak encoding, and wherein the noise-floor encoding uses further reserved bits.

10. The encoder of claim 8, wherein, from among an overall number of bits, up to a first number of bits is used for the peak encoding, a first number of reserved bits and any ones of the first number of bits not consumed in the peak encoding are used for the low-frequency encoding, and a second number of reserved bits is used for the noise-floor encoding.

11. The encoder of claim 8, wherein each MDCT coefficient represents a frequency bin, and wherein, for each peak region that is encoded, the peak encoder is configured to:
- encode the spectrum position and sign of the MDCT coefficient representing the peak;
- quantize the peak gain;
- encode the quantized peak gain;
- scale the MDCT coefficients in surrounding frequency bins by the inverse of the quantized peak gain; and
- shape encode the scaled MDCT coefficients.

12. The encoder of claim 8, wherein each peak region comprises the frequency bin at the spectrum position of the corresponding peak and at least one frequency bin on each side of the frequency bin at the spectrum position of the corresponding peak.

13. The encoder of claim 8, wherein the low-frequency set encoder is configured to encode in order from lowest frequency to highest frequency, according to a total number of bits available for the low-frequency encoding.

14. The encoder of claim 8, wherein the low-frequency encoding is based on a gain-shape encoding scheme that is based on scalar gain quantization and factorial pulse shape encoding.

15. A user equipment (UE) comprising:
- radio communication circuitry; and
- the processor according to claim 8.

* * * * *